United States Patent
Byun et al.

(10) Patent No.: US 7,349,060 B2
(45) Date of Patent: Mar. 25, 2008

(54) LOADER AND BONDING APPARATUS FOR FABRICATING LIQUID CRYSTAL DISPLAY DEVICE AND LOADING METHOD THEREOF

(75) Inventors: Young Sang Byun, Kumi-shi (KR); Kyung Su Chae, Taegu-kwangyokshi (KR); Sang Ho Park, Pusan-kwangyokshi (KR); Se Joon Baek, Pusan-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 494 days.

(21) Appl. No.: 10/965,900

(22) Filed: Oct. 18, 2004

(65) Prior Publication Data

US 2005/0117110 A1    Jun. 2, 2005

(30) Foreign Application Priority Data

Dec. 2, 2003    (KR) ................. 10-2003-0086721
Dec. 23, 2003    (KR) ................. 10-2003-0095427

(51) Int. Cl.
*G02F 1/13*    (2006.01)
(52) U.S. Cl. .................................. 349/187
(58) Field of Classification Search ............... 349/187
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron |
| 4,691,995 A | 9/1987 | Yamazaki |
| 4,775,225 A | 10/1988 | Tsuboyama |
| 5,247,377 A | 9/1993 | Omeis |
| 5,263,888 A | 11/1993 | Ishihara |
| 5,379,139 A | 1/1995 | Sato |

(Continued)

FOREIGN PATENT DOCUMENTS

CN    1447159 A    2/2003

(Continued)

*Primary Examiner*—David Nelms
*Assistant Examiner*—Phu Vu
(74) *Attorney, Agent, or Firm*—McKenna Long & Aldridge LLP

(57) ABSTRACT

Loader and bonding apparatus for fabricating a liquid crystal display device, and a loading method thereof are disclosed, the method for loading a substrate by using a loader having an arm with a plurality of robot fingers, and a plurality of adsorption pads on each of the robot fingers at regular intervals for adsorbing a substrate, and a bonding apparatus having a plurality of adsorption pins mounted on the upper stage movable in up/down direction for adsorption of the substrate being loaded, including the steps of the loader adsorbing, and holding the substrate at a back side thereof, and inverting the substrate, by using the adsorption pads, positioning the inverted substrate under the upper stage of the bonding apparatus, moving down the adsorption pins on the upper stage, and adsorbing the substrate at the back side thereof through the adsorption pins, removing adsorption force of the adsorption pads, and the loader being moved out of the bonding apparatus, and moving up the adsorption pins, and securing the substrate to the upper stage, whereby permitting inversion of the substrate without using an inverting device, and to prevent sagging of a large sized substrate to enable easy loading of the substrate on the bonding apparatus.

40 Claims, 14 Drawing Sheets

U.S. PATENT DOCUMENTS

| | | | |
|---|---|---|---|
| 5,406,989 A | 4/1995 | Abe |
| 5,499,128 A | 3/1996 | Hasegawa |
| 5,507,323 A | 4/1996 | Abe |
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shimizu |
| 5,742,370 A | 4/1998 | Kim |
| 5,757,451 A | 5/1998 | Miyazaki |
| 5,852,484 A | 12/1998 | Inoue |
| 5,854,664 A | 12/1998 | Inoue |
| 5,861,932 A | 1/1999 | Inata |
| 5,875,922 A | 3/1999 | Chastine |
| 5,952,676 A | 9/1999 | Sato |
| 5,956,112 A | 9/1999 | Fujimori |
| 6,001,203 A | 12/1999 | Yamada |
| 6,011,609 A | 1/2000 | Kato |
| 6,016,178 A | 1/2000 | Kataoka |
| 6,016,181 A | 1/2000 | Shimada |
| 6,055,035 A | 4/2000 | Von Gutfeld |
| 6,163,357 A | 12/2000 | Nakamura |
| 6,219,126 B1 | 4/2001 | Von Gutfeld |
| 6,226,067 B1 | 5/2001 | Nishiguchi |
| 6,236,445 B1 | 5/2001 | Foschaar |
| 6,304,306 B1 | 10/2001 | Shiomi |
| 6,304,311 B1 | 10/2001 | Egami |
| 6,337,730 B1 | 1/2002 | Ozaki |
| 6,414,733 B1 | 7/2002 | Ishikawa |
| 6,784,970 B2 * | 8/2004 | Lee et al. ............... 349/189 |
| 6,893,311 B2 * | 5/2005 | Lee et al. ............... 445/24 |
| 2002/0008838 A1 | 1/2002 | Matsuda |
| 2003/0175097 A1 | 9/2003 | Lee et al. |
| 2003/0178134 A1 | 9/2003 | Muramoto et al. |
| 2003/0178150 A1 | 9/2003 | Lee et al. |

FOREIGN PATENT DOCUMENTS

| | | |
|---|---|---|
| CN | 1469171 | 1/2004 |
| DE | 103 52 412 A1 | 6/2004 |
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | 07-263531 | 10/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |

| | | |
|---|---|---|
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-014360 | 1/2002 |
| JP | 2002-023176 | 1/2002 |
| JP | 2002-049045 | 2/2002 |
| JP | 2002-079160 | 3/2002 |
| JP | 2002-080321 | 3/2002 |
| JP | 2002-082340 | 3/2002 |
| JP | 2002-090759 | 3/2002 |
| JP | 2002-090760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| JP | 2003-241157 A | 8/2003 |
| JP | 2004-102215 | 4/2004 |
| KR | 2000-0035302 | 6/2000 |
| KR | 1020020089832 A | 11/2002 |
| KR | 1020030075521 A | 9/2003 |

\* cited by examiner

121(230)

121(230)

LOADER AND BONDING APPARATUS FOR FABRICATING LIQUID CRYSTAL DISPLAY DEVICE AND LOADING METHOD THEREOF

This application claims the benefit of Korean Application Nos. P2003-86721, filed on Dec. 2, 2003, and P2003-95427, filed on Dec. 23, 2003, which are hereby incorporated by reference for all purposes as if fully set forth herein.

This application incorporates by reference two co-pending application Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to loaders and bonding apparatus for fabricating a liquid crystal display device, and more particularly, to a loader for fabricating a liquid crystal display device, in which a substrate can be inverted without using a separate inverting device, and sagging of a large sized substrate is prevented, to enable easy loading the substrate onto a bonding apparatus, a bonding apparatus which enables easy separation of bonded substrates from an upper stage when the upper stage moves up after bonding the substrates, and a method for loading a substrate using the same.

2. Discussion of the Related Art

Keeping pace with development of an information oriented society, demands for display devices increase gradually in various forms. Recently, to meet the demands, various flat display devices, such as LCD (Liquid Crystal Display Device), PDP (Plasma Display Panel), ELD (Electro Luminescent Display), VFD (Vacuum Fluorescent Display), have been studied, and some of which are used as display devices in various apparatuses.

Of the various display devices, currently the LCD is used mostly for mobile display devices because of advantages such as good picture quality, light weight, thin, and low power consumption, while replacing the CRT (Cathode Ray Tube). Besides the mobile display devices, such as monitors for notebook computers, the LCD is being developed for use as a monitor for televisions for receiving and displaying a broadcasting signal and for use as a monitor for computers.

Despite various technical developments, for the LCD to serve as display devices in various fields, efforts for enhancing the picture quality are contradictory to above advantages in many aspects. Therefore, for using the LCD in various fields as general display devices, a key to development of the LCD lies on the extent of realization of a high quality picture, such as high definition, high luminance, and large sized picture, while the features of light weight, thin, and low power consumption are maintained.

Such an LCD is provided with a liquid crystal panel for displaying a picture, and a driving unit for applying a driving signal to the liquid crystal panel. The liquid crystal display panel is provided with upper and lower substrates bonded together, with a space between the substrates, and a liquid crystal layer between the upper, and the lower substrates.

Formed on the first glass substrate (a TFT array substrate) are a plurality of gate lines arranged at regular intervals in one direction, a plurality of data lines arranged at regular intervals perpendicular to the gate lines, a plurality of pixel electrodes on every pixel region defined at every cross of the gate lines and the data lines in a form of matrix, and a plurality of thin film transistors (TFT) to be switched in response to a signal on the gate line for transmission of a signal on the data line to each pixel electrode.

Formed on the upper substrate (a color filter substrate) are a black matrix layer for shielding a light incident on parts excluding the pixel regions, R, G, B color filter layers for expressing colors, and a common electrode for displaying a picture.

The first, and second substrates are bonded with sealant with a space between the substrates provided by means of spacers.

For bonding the two substrates, one of the two substrates is inverted to face each other, and the two substrates are loaded on the bonding apparatus for bonding.

There are different methods for forming the liquid crystal layer between the two substrates: a liquid crystal injecting method and a liquid crystal dispensing method.

In the liquid crystal injecting method, a sealant pattern is formed to have a liquid crystal injection hole before bonding the two substrates together. The bonded two substrates are cut into unit liquid crystal display panels. Thus, a liquid crystal injection hole in each of unit liquid crystal display panel exposed and the unit panel is dipped into liquid crystal, while maintaining a vacuum between the two substrates, to inject the liquid crystal between the two substrates by capillary tube phenomenon. Once the liquid crystal is injected thus, the liquid crystal injection hole is sealed with a sealant.

However, such a liquid crystal injection type LCD fabricating method has a poor productivity because of the cutting into unit liquid crystal display panels, and dipping of the liquid crystal injection hole in each of unit liquid crystal display panel into liquid crystal liquid while maintaining a vacuum between the two substrates, all of which require a lot of time. Also, for fabrication of a large sized liquid crystal display device, imperfect injection of the liquid crystal into the panel causes defects.

Therefore, the applicant has filed a U.S. patent application Ser. No. 10/126,963 disclosing a bonding apparatus for bonding two substrates after dispensing an appropriate amount of liquid crystal on each liquid crystal display panel regions before the bonding of the two substrates.

FIG. 1 schematically illustrates a bonding apparatus (U.S. patent application Ser. No. 10/126,963) filed by the applicant; FIGS. 2A and 2C schematically illustrate sections of the loader unit and the upper stage in FIG. 1; and FIGS. 3A-3C illustrates the steps of the bonding method in FIG. 1.

Referring to FIG. 1, the LCD bonding apparatus is provided with a vacuum chamber 110, a stage unit, a stage moving device, a vacuum unit, a vent device, and a loader unit 30.

The vacuum chamber 110 has an inside space which becomes a vacuum state or an atmospheric pressure state selectively, for carrying out bonding by application of a pressure between substrates, and bonding by using a pressure difference between the substrates in succession, and an opening 111 in a peripheral surface thereof for putting in/taking out the substrates.

The vacuum chamber 110 has an air discharge pipe 112 connected to one side of the peripheral surface for receiving air suction force from the vacuum device and discharging air from the inside space, and a vent pipe 113 connected to one side of the peripheral surface for receiving air or other gas (N2) from an outside of the space, and maintaining the space in an atmospheric state, thereby enabling the inside space to be in a vacuum state or to release the vacuum state, selectively.

The air discharge pipe 112 and the vent pipe 113 have electronically controlled shut off valves 112a and 113a provided thereon, respectively, for selective shut off of the pipes.

The stage unit has an upper stage 121 and a lower stage 122 mounted in an upper space and a lower space of the vacuum chamber 110 to face each other, for holding respective substrates 10 and 20 put into the vacuum chamber 110 by the loader unit 30 at required working positions.

The upper, and lower stages 121 and 122 are respectively provided with at least one Electro Static Chuck (ESC) 121a, and 122a mounted in a recess thereof for providing static force thereto for holding the substrate and at least one vacuum hole 121b for receiving vacuum force to hold the substrate with the vacuum.

Each of the electro static chucks 121a and 122a has a plurality of flat electrode pairs for applying DC currents of opposite polarity thereto for making an electro static attachment.

The vacuum holes 121b in the upper stage 121 formed around each of the electro static chucks 121a in an underside surface of the upper stage 121 are in communication through one or a plurality of pipe lines 121c for receiving the vacuum force from a vacuum pump 123 connected to the upper stage 121.

The lower stage 122 has at least one electro static chuck 122a mounted in an upper surface thereof for providing static force to hold the substrate, and at least one vacuum hole (not shown) in the upper surface for receiving the vacuum force to adsorb and hold the substrate.

The stage moving device has a moving shaft 131 for moving the upper stage 121 in up/down direction selectively, a rotating shaft 132 for rotating the lower stage 122 in left/right direction, and driving motors 133 and 134 respectively shaft coupled to the stages 121 and 122 at an inside or outside of the vacuum chamber 110 for driving respective shaft, selectively.

The vacuum device provides the vacuum force to the vacuum chamber 110 so that the vacuum chamber 110 is in a vacuum state selectively, and has a vacuum pump for absorbing air to form a vacuum. A space in the vacuum pump 200 is in communication with the air discharge pipe 112 in the vacuum chamber 110.

The loader unit 30, a separate device from the vacuum chamber 110 and various units in the vacuum chamber 110, is installed on an outside of the vacuum chamber 110, for receiving the first substrate 10 having liquid crystal dispensed thereon and the second substrate 20 having the sealant coated thereon and for putting into or taking out of the vacuum chamber 110 of the bonding apparatus.

The loader unit is provided with a first arm 31 for carrying the first substrate 10 having the liquid crystal dispensed thereon, and a second arm 32 for carrying the second substrate 20 having the sealant coated thereon. As illustrated in FIGS. 2A-2C, each of the first and second arms 31 and 32 has at least two robot fingers 32a and 32b for placing the first or second substrate 10 or 20 thereon. Even though more robot fingers are better for stable loading of the substrate on the vacuum chamber, the number of the robot fingers are limited because it is required that the robot finger is only in contact with a non-display region of the substrate, which is in a state adsorbed to the upper stage in an inverted state.

Taking into account that the first substrate 10 to be placed on the first arm 31 is in a state the liquid crystal are dispensed thereon and that the second substrate 20 to be placed on the second arm 32 has a side having the sealant coated thereon faced downward, the first arm 31 is positioned over the second arm 32 in a standby state before the substrate is carried into the inside of the vacuum chamber 110 for preventing various foreign matter formed as the second arm 32 moves from flying down onto the liquid crystal on the first substrate 10 placed on the first arm 31, which might occur if the second arm 32 is positioned over the first arm 31 in advance.

Moreover, an aligning device 60 is provided for verifying alignment of the substrates 10 and 20 carried into the vacuum chamber 110 by the loader unit and loaded on respective stages 121 and 122.

A method for fabricating a liquid crystal display device by using the bonding apparatus will be described.

The first substrate 10 having the thin film transistor array formed thereon, and the liquid crystal dispensed thereon, and the second substrate 20 having the color filter array formed thereon, and the sealant coated thereon, are provided.

Then, after the second substrate 20 is inverted such that a side having the sealant coated thereon faces downward, the loader unit 30 causes the first substrate 10 having the liquid crystal dispensed thereon to standby on the first arm 31 and the second substrate 20 having the sealant coated thereon to standby on the second arm 32.

In this state, if the opening 111 in the vacuum chamber 110 is opened, as illustrated with a dash line in FIG. 1, the loader unit 30 controls the second arm 32 so that the second arm 32 carries the second substrate 20 having the sealant coated thereon onto the upper stage 121 in the upper space of the vacuum chamber 110 through the opening 111, controls the upper stage 121 to adsorb the second substrate 20 by vacuum, and, thereafter, controls the first arm 31 so that the first arm 31 carries the first substrate 10 having the liquid crystal dispensed thereon onto the lower stage 122 in the lower space of the vacuum chamber 110, and controls the lower stage 122 to adsorb the first substrate 10 by vacuum.

A method for adsorbing the second substrate 20 to the upper stage 121 will be described in more detail.

Referring to FIG. 2A, since the second substrate 20 is in an inverted state in which the side of the second substrate 20 having the sealant coated thereon faces downward, the second arm is positioned to the second substrate 20, such that the non-display regions of the second substrate 10 are in contact with the robot fingers 32a and 32b, and the second arm 32 is positioned under the upper stage 121 in the vacuum chamber 110.

Then, the upper stage 121 moves down until the upper stage 121 is in contact with the second substrate 20 on the second arm 32, and as illustrated in FIG. 2C, the upper stage adsorbs the second substrate 20 by vacuum and moves up.

In above process, if there are bonded substrates on the lower stage because a bonding process occurred right before, by unloading the bonded substrate present on the lower stage after the second arm 32 that carried in the second substrate 20 makes the second substrate adsorbed to the upper stage, loading and unloading can be carried out at the same time, to shorten a process time period.

Referring to FIG. 3A, upon finishing loading of the substrates 10, and 20 on the upper stage 121 and the lower stage 122, respectively, by above process, the arms 31 and 32 of the loader unit 30 move away from the vacuum chamber 110, and a door (not shown) on the opening 111 of the vacuum chamber 110 closes the opening 111 to enclose the inside space of the vacuum chamber 110.

Thereafter, the vacuum pump 200 operates to generate a vacuum, while the shut off valve 112a on the air discharge pipe 112 of the vacuum chamber 110 is left open, to make the vacuum chamber in a vacuum state.

Thus, when the vacuum chamber 110 is in a vacuum state by a time period of operation of the vacuum pump 200, operation of the vacuum pump 200 stops, and the shut off valve 112a on the air discharge pipe 112 is closed, to close the air discharge pipe 112.

Once the vacuum chamber 110 is in a vacuum state, the upper stage 121 and the lower stage 122 provide power to the electro static chucks 121a, and 122a, to absorb the substrate 10 and 20, respectively.

Under this state, referring to FIG. 3B, the stage moving device puts the driving motor 133 into operation, to move down the upper stage 121 until the upper stage comes close to the lower stage 122, and then, the aligning device 60 verifies alignment of the substrates 10 and 20, respectively, attached to the stages 121 and 122 and provides control signals to the moving shaft 131 and the rotation shaft 133 coupled to the stages 121 and 122, respectively, for alignment of the substrates.

Then, the stage moving device keeps moving in response to driving signal provided thereto continuously, to press down the second substrate 20 attached to the upper stage 121 to the first substrate 10 attached to the lower stage 122 until a primary bonding of the substrates is made.

The primary bonding is not the end of a complete bonding process by pressing through moving of the stages 121 and 122, but bonding enough to prevent infiltration of air between the substrates when the vacuum chamber is turned into an atmospheric pressure state.

Therefore, upon completion of the primary bonding process, the static adsorption force of the upper stage 121 is removed, and the upper stage 121 is separated from the bonded substrates 10 and 20. In this instance, referring to FIG. 3C, it is possible that the bonded substrates 10 and 20 are lifted following the upper stage 121 that is moving upward.

As the shut off valve 113a having closed the vent pipe 113 is operated, the vent pipe 113 is opened, to turn the vacuum chamber 110 into an atmospheric pressure state, to cause a pressure difference between inside and outside of the bonded substrates inside of the vacuum chamber 110, to further press down and bond the substrates, again.

According to this, the bonding between the substrates becomes more perfect. When such a bonding process is finished, the door (not shown) on the vacuum chamber 110 is opened to open the opening 111.

Thereafter, the loader unit 30 unloads the bonded substrates, and above series of steps are repeated to bond successive substrates.

However, the method for loading the substrate, and the method for bonding the substrate in the related art bonding apparatus have the following problems.

First, though the more a number of the robot fingers, the more stable loading of the substrate on the vacuum chamber, the number of the robot fingers are limited because it is required that the robot finger is only in contact with a non-display region of the substrate that is in a state adsorbed to the upper stage in an inverted state.

Second, as illustrated in FIGS. 2A-2C, since the loader unit supports the inverted substrate at edges thereof during loading the substrate in the vacuum chamber, the substrates sags down the more as the size of the substrate becomes the greater, to cause difficulty in adsorbing the substrate to the stage.

Third, since the loader unit is not provided with means for adsorbing the substrate and the arm is not rotatable, requiring a separate inverting device for inverting the substrate that is to be adsorbed to the upper stage before loading the substrate on the bonding apparatus, the cost for a fabrication processing line increases.

Fourth, as illustrated in FIG. 3C, upon completion of the primary bonding process, the static adsorption force of the upper stage is removed, and the upper stage is separated from the bonded substrates when it is possible that the bonded substrates are lifted following the upper stage that is moving upward, to separate the first and second substrates, or to cause infiltration of air between the two substrates, resulting in defect of the bonding.

SUMMARY OF THE INVENTION

Accordingly, the present invention is directed to loader and bonding apparatus for fabricating a liquid crystal display device and a loading method thereof that substantially obviates one or more problems due to limitations and disadvantages of the related art.

An advantage of the present invention is to provide loader and bonding apparatus for fabricating a liquid crystal display device, wherein the loader can load a substrate on a bonding apparatus by vacuum adsorption of a back side of the substrate, and the bonding apparatus has an upper stage which can vacuum adsorb and pad adsorb for prevention of sagging of the substrate, to make adsorption by the upper stage easy, enables easy separation of the bonded substrates from the upper stage during venting, and requires no separate substrate inverting device, and a loading method thereof.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a loader for fabricating a liquid crystal display device includes at least one arm having a plurality of robot fingers, and a plurality of adsorption pads on each of the robot fingers at regular intervals for adsorbing a substrate, vacuum means for providing vacuum adsorption force to each of the adsorption pads, and a pipeline provided between the vacuum means and the adsorption pads.

In another aspect of the present invention, a bonding apparatus for fabricating a liquid crystal display device includes a vacuum chamber for being at a vacuum state or an atmospheric state selectively, the vacuum chamber having an opening for carrying in/out a substrate, an upper stage and a lower stage respectively in an upper space and a lower space of the vacuum chamber opposite to each other, for holding respective substrates carried into the vacuum chamber, and bonding the substrates, and a plurality of adsorption pins mounted on the upper stage movable in up/down direction for adsorption of the substrate loaded on the vacuum chamber.

In another aspect of the present invention, a bonding apparatus for fabricating a liquid crystal display device includes a base frame for forming an outer appearance, a lower chamber unit mounted on the base frame, and an upper chamber unit over the lower chamber unit in a state free from the base frame, chamber moving means provided to the base frame for moving the upper chamber unit in up/down direction, an upper stage, and a lower stage respectively mounted in inside spaces of the chamber units for holding one pair of substrates, sealing means on a surface of at least one of the chamber units for sealing a space having the stages mounted therein from a space on an outside of the space when the chamber units join, and a plurality of adsorption pins mounted on the upper stage movable in up/down direction for adsorbing the substrate loaded thereon.

The adsorption pins have a function for separating the bonded substrates from the upper stage.

In another aspect of the present invention, a bonding apparatus for fabricating a liquid crystal display device includes a vacuum chamber for being at a vacuum state or an atmospheric state selectively, the vacuum chamber having an opening for carrying in/out a substrate, an upper stage and a lower stage respectively in an upper space and a lower space of the vacuum chamber opposite to each other, for holding respective substrates carried into the vacuum chamber, and bonding the substrates, and separating means mounted on the upper stage for separating bonded substrates from the upper stage.

In further aspect of the present invention, a bonding apparatus for fabricating a liquid crystal display device includes a base frame for forming an outer appearance, a lower chamber unit mounted on the base frame, and an upper chamber unit over the lower chamber unit in a state free from the base frame, chamber moving means provided to the base frame for moving the upper chamber unit in up/down direction, an upper stage, and a lower stage respectively mounted in inside spaces of the chamber units for holding one pair of substrates, sealing means on a surface of at least one of the chamber units for sealing a space having the stages mounted therein from a space on an outside of the space when the chamber units join, and separating means mounted on the upper stage for separating bonded substrates from the upper stage.

In still further aspect of the present invention, a method for loading a substrate by using a loader having an arm with a plurality of robot fingers, and a plurality of adsorption pads on each of the robot fingers at regular intervals for adsorbing a substrate, and a bonding apparatus having a plurality of adsorption pins mounted on the upper stage movable in up/down direction for adsorption of the substrate being loaded, includes the steps of the loader adsorbing, and holding the substrate at a back side thereof, and inverting the substrate, by using the adsorption pads, positioning the inverted substrate under the upper stage of the bonding apparatus, moving down the adsorption pins on the upper stage, and adsorbing the substrate at the back side thereof through the adsorption pins, removing adsorption force of the adsorption pads, and the loader being moved out of the bonding apparatus, and moving up the adsorption pins, and securing the substrate to the upper stage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

The applicant filed an application (U.S. patent application Ser. No. 10/661,515) disclosing a bonding apparatus having an upper chamber unit and a lower chamber unit without the vacuum chamber, to form a vacuum chamber when the upper and lower chamber units are put together. Since the present invention is also applicable to the bonding apparatus, the bonding apparatus will be described, briefly.

Figure 4:
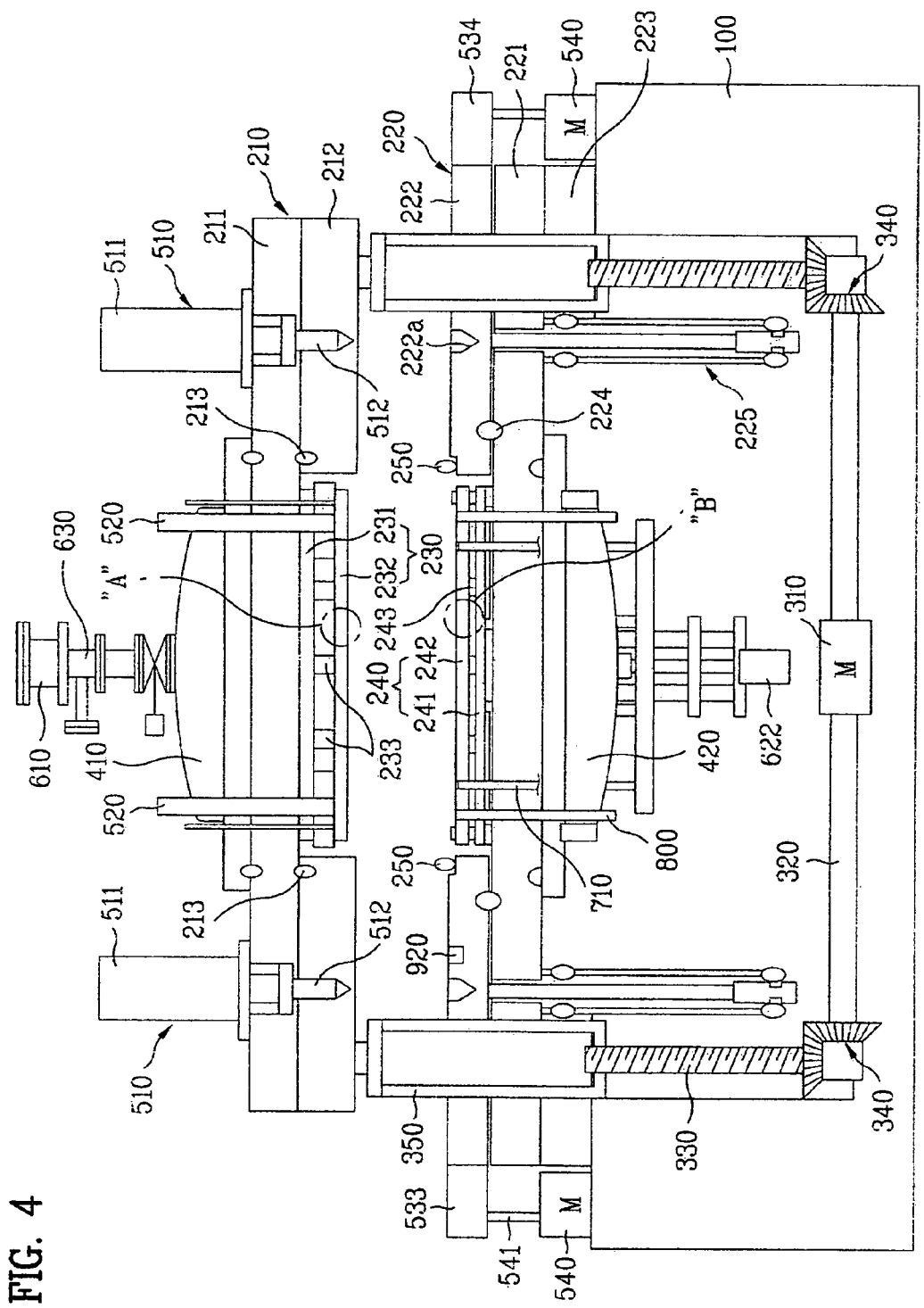
FIG. 4 is a diagram schematically illustrating an another exemplary bonding apparatus for fabricating a liquid crystal display device filed by the applicant.

FIG. 4 illustrates a diagram showing an initial state of a bonding apparatus for fabricating a liquid crystal display device described in copending U.S. patent application Ser. No. 10/661,515 filed by the applicant.

Referring to FIG. 4, the bonding apparatus includes a base frame 100, an upper chamber unit 210 and a lower chamber unit 220, chamber moving means 310, 320, 330, 340, and 350, an upper stage 230 and a lower stage 240, sealing means, one pair of low vacuum chamber units 410 and 420, aligning means 510 and 520, vacuum pumping means 610 and 622, support means 710, and photosetting means.

The base frame 100 is fixed to the ground and forms an outer appearance of the bonding apparatus and supports other units.

The upper chamber unit 210 and the lower chamber unit 220 are mounted on an upper portion and lower portion of the base frame 100 and joinable to each other.

The upper chamber unit 210 includes an upper base 211 exposed to an external environment and a rectangular upper chamber plate 212 having a hollow therein.

In the hollow of the upper chamber plate 212 is an upper stage 230, mounted to be movably interlocked with the upper chamber unit 210.

There is a sealing member 213 (hereafter called as a "first sealing member") between the upper base 211 and the upper chamber plate 212 of the upper chamber unit 210, for sealing between an inside space and an outside space of the upper chamber plate 212.

The lower chamber unit 220 includes a lower base 221 fixed to the base frame 100, and a rectangular lower chamber plate 222 with a hollow mounted on an upper surface of the lower base 221 to be movable in front/rear, and left/right direction.

In the hollow of the lower chamber plate 222 is a lower stage 240 fixed to an upper surface of the lower base 221.

There is a sealing member 224 (hereafter called as a "second sealing member") between the lower base 221 and the lower chamber plate 222 of the lower chamber unit 220, for sealing between a space having the lower stage 40 mounted therein and an outside space thereof inside of the lower chamber plate 222 with reference to the second sealing member 224.

Along with this, there is at least one support unit 225 between the lower base 221 and the lower chamber plate 222, so that the lower chamber plate 222 can maintain a state in which the lower chamber plate 222 is spaced a distance from the lower base 221.

The support unit 225 has one end fixed to an underside of the lower chamber plate 222, and the other end coupled to a holding member fixed to an underside of the lower base 221. The other end of the support unit 225 is coupled to the holding member to allow free rotation. The support unit 225 frees the lower chamber plate 222 from the lower base 221, so that the lower chamber plate 222 can move in front/rear, and left/right direction.

The first sealing member 213 and the second sealing member 224 may be formed of a material good for sealing, such as gasket or O-ring.

The chamber moving means includes a driving motor 310 fixed to the base frame 100, a driving shaft 320 coupled to the driving motor 310, a connecting shaft 330 vertical to the driving shaft 320 for receiving a driving force from the driving shaft 320, a connecting unit 340 for connecting the driving shaft 320 and the connecting shaft 330, and a jack unit 350 at an end of the connecting shaft 330.

The driving motor 310 is a bilateral motor positioned on a bottom of an inside of the base frame 100 having shaft thereof projected parallel to the ground.

The driving shaft 320 is coupled to the driving motor 310 to transmit driving force in a horizontal direction of the two shafts, and the connecting shaft 330 is coupled to transmit the driving force in a direction vertical to the driving shaft 320.

The jack unit 350 at the end of the connecting shaft 330 moves up/down depending on a rotation direction of the connecting shaft 330 in a state the jack unit 350 is in contact with the upper chamber unit 210, to move the upper chamber unit 210 and has a configuration of a general nut housing.

The connecting unit 340 has bevel gears for transmission of the horizontal rotating force from the driving shaft 320 to the connecting shaft 330 connected in a vertical direction.

Each of the stages 230 and 240 includes a fixed plate 231 or 232 fixed to the chamber unit 210 or 220, an adsorption plate 232 or 242 for holding a relevant substrate, and a plurality of holding blocks 233 and 243 mounted between the fixed plates 231 and 241 and the adsorption plate 232 and 242.

The adsorption plate 232 and 242 are formed of polyimide and configured to be Electro Static Chucks for holding a relevant substrate by an electro static force.

The sealing means is an O-ring (hereafter called as "a third sealing member") 250 mounted to be projected to a predetermined height from the upper surface of the lower chamber plate 222 of the lower chamber unit 220, and formed of general rubber.

In this instance, it is required that the third sealing member 250 has a thickness enough to prevent the two substrates respectively held at the stages 230 and 240 mounted in an inside space of joined upper and lower chamber units 210 and 220 from being brought into close contact to each other.

Each of the lower vacuum chamber units 410 and 420 is formed to have a space in a vacuum state and has one surface brought into contact with an upper surface of the upper chamber unit 210 or an underside surface of the lower chamber unit 220.

Each of the low vacuum chamber units 410 and 420 has a depth which becomes the deeper as it goes the farther to a central portion.

This shape is provided for preventing sagging of respective stages 230, and 240, which becomes the greater toward a central portion of the stages, caused by a pressure difference from the atmospheric pressure when the inside space of the joined upper chamber unit 210 and the lower chamber unit 220 is evacuated.

The aligning means aligns the substrates 110 and 120 held at the stages 230 and 240 respectively, when the upper stage 230 is moved, while the lower stage 240 is left stationary for alignment of the substrates 110 and 120.

The aligning means includes a plurality of linear actuators 510, a plurality of align cameras 520, a plurality of cams (not shown), and a plurality of restoring means (not shown).

The linear actuators 510 are mounted around the upper chamber units 210 so that the linear actuators 510 respectively move down moving shafts 511 until the moving shafts 511 are received in receiving holes 222a in the lower chamber plate 222 of the lower chamber unit 220, respectively.

Along with this, the linear actuators 510 cause the upper stage 230 to be tilted the same with tilt of the lower stage 240, so that working surfaces of the stages 230 and 240 are substantially parallel.

The linear actuators 510 should be mounted on at least two diagonal corners of the upper chamber unit 210, and preferably at four corners of the upper chamber unit 210.

The receiving hole 222a should have a shape fit to an end shape of the moving shaft 511. That is, an underside surface of the moving shaft 511 and an inside surface of the receiving hole 222a may be sloped downward toward a central portion. This configuration allows for accurate positioning of the moving shaft 511 and the receiving hole 222a during a time period an end of the moving shaft 511 is guided by the sloped surface of the receiving hole 222a, even if positions of the moving shaft 511 and the receiving hole 222a are not aligned accurately at the time the moving shaft 511 and the receiving hole 222a are brought into contact.

The align cameras 520 are mounted to observe align marks (not shown) on substrates (not shown) to be secured to respective stages 230 and 240 through the upper chamber unit 210 or the lower chamber unit 220, and at least two of the cameras are required for observation of two diagonal corners of each of the substrates to be secured to the upper stage 230 and the lower stage 240.

The vacuum pumping means 610 and 622 are mounted at least one of the chamber units 210 and 220 for evacuation of the inside spaces of the chamber units 210 and 220.

The support means 710 is passed through and projected upward beyond the lower stage 240, for safe seating of the substrate 120 being loaded onto the lower stage 240, and for unloading the bonded substrates 110 and 120 from the lower stage 240.

If the substrate 120 is not loaded, an upper surface of the support means 710 is positioned lower than an upper surface of the lower stage 240.

The photo-setting means are mounted to pass through at least one of the chamber units 210 and 220, for temporary setting of sealant coated area on the substrates 110 and 120 secured to the stages 230 and 240, respectively. The photo-setting means includes a UV directing unit 800 for directing a UV beam.

Moreover, a gap determining sensor 920 is further mounted on a surface of the lower chamber plate 222 of the lower chamber unit for determination of a gap between the chamber units 210 and 220, for determining an error of movement of the upper chamber unit 210 during the process in advance of the bonding process.

A method for fabricating a liquid crystal display device using the foregoing bonding apparatus will be described, briefly.

A first substrate having liquid crystal dispensed thereon and a second substrate having sealant coated thereon are provided from different process lines.

The loader unit (not shown) carries the second substrate having the sealant (not shown) coated thereon into an inner side of a space between the chamber units 210 and 220, facing a side of the second substrate having the sealant coated thereon downward.

Then, the upper chamber unit 210 is moved down until the upper stage 230 comes close to the second substrate and has the second substrate attached thereto by vacuum adsorption force and static adsorption force from the adsorption plate (ESC) 232 and is then moved upward.

Upon finishing attachment of the second substrate to the upper stage 230, the upper chamber unit 210 moves up to an initial position, and the loader unit carries the first substrate having the liquid crystal dispensed thereon into the space between the chamber units 210 and 220.

In this state, the support means 710 mounted on the lower stage 240 moves up until the support means 710 supports the first substrate placed on the loader unit, then, the loader unit comes out. Then, the support means 710 moves down until the first substrate is seated on the lower stage 240, so that the lower stage 240 holds the first substrate by vacuum force and static force.

Upon finish of loading of the substrates, the driving motor 310 of the chamber moving means is driven to rotate the driving shaft 320 and the connecting shafts 330 to move down the jack units 350. In this instance, the upper chamber unit 210 placed on the jack units 350 moves down together with the jack units 350.

In this time, since each of the moving shafts 511 is in a state projected downward to a height by the linear actuators 510, ends of the moving shafts 511 are received in the receiving holes 222*a* and come into contact with inside surfaces of the receiving holes 222*a* as the upper chamber unit 210 moves down.

Thereafter, the moving shafts 511 of the linear actuators 510 move down in a state projected as high as a predetermined height, together with the upper chamber unit 210 keeping moving down by the chamber moving means, until underside surface of the upper chamber plate 212 is brought into contact with the third sealing member 250 mounted along a periphery of the lower chamber plate 222.

In this state, if the jack units 350 keep moving down, the jack units 350 move out of the upper chamber unit 210, and the inside space of the chamber units 210 and 220 having the substrates 110 and 120 positioned thereon is sealed from an outside space by gravity of the upper chamber unit 210 and atmospheric pressure.

Along with this, a certain amount of pressing down of the substrates respectively attached to the stages 230 and 240 are made by the gravity of the upper chamber unit 210, and the atmospheric pressure.

In this instance, the substrates are not bonded completely, but enough to change a position of one of the substrates. Information read by the gap determining sensor 920 is used for the gap between the upper chamber unit 210 and the lower chamber unit 220.

Upon driving the vacuum pump means 610 under above state, the space having the substrate therein is evacuated. Upon full evacuation of the space, the aligning means aligns the substrates.

That is, the align cameras observe the align marks on the substrates and determine deviation between the substrates, determine a distance for the upper stage 230 to be moved with reference to the deviation, and controls an amount of rotation of the cams (not shown), to move the lower chamber plate 222, thereby aligning the substrates.

In this instance, since the lower chamber plate 222 is connected to the upper chamber unit 210 by means of the linear actuators 510, and has a gap to the lower base 221 by the support unit 225, if the lower chamber plate 222 moves in one direction by rotation of the cams (not shown), the upper chamber unit 210 also moves to the direction of movement of the lower chamber unit 222.

Particularly, since the lower chamber unit 222 is separate from the lower stage 240, an effect is obtained, in which only the upper stage 230 moves, thereby enabling smooth alignment of the substrates attached to the stages 230 and 240, respectively.

After aligning the substrates and applying a pressure to bond the sealant, the adsorption force and the static force applied to the upper stage 230 are removed, and the chamber moving means is put into operation, to move up the upper chamber unit 210 by a predetermined height.

In this instance, the second substrate attached to the upper stage 230 is separated from the upper stage 230, and maintains a predetermined degree of bonding with the first substrate attached to the lower stage 240.

Of course, the predetermined height is required to be small enough to maintain a space inside of the chamber plates 212 and 222 to be in a sealed state from an external environment by the third sealing member 250.

In this state, determination of alignment of the substrates are made again by the align cameras 520 by using the align marks on the substrates.

If the alignment of the substrates falls outside of an error range due to inaccurate alignment as a result of the alignment determination, position adjustment of the upper stage 230 is made again by using the cams (not shown).

If the alignment is accurate as the result of determination of alignment, N$_2$ gas is injected into the space having the substrate positioned therein until the space is at the atmospheric pressure, for applying a pressure to the two substrate bonded with the sealant. That is, since a space between the two substrates bonded with the sealant is at vacuum, the two substrates are further pressed by the vacuum in the space and an external atmospheric pressure, such that the two substrates are bonded completely.

Then, UV light is directed to the sealant between the bonded two substrates, to set the sealant, and the bonded substrates are unloaded. Upon finishing unloading of the bonded substrates, bonding of other substrates is carried out repeatedly.

In order to bond two substrates in the bonding apparatus described with reference to FIGS. 1 and 4, a loader is required for loading the substrates, and at least one substrate is required to be inverted before loading.

Figure 1:
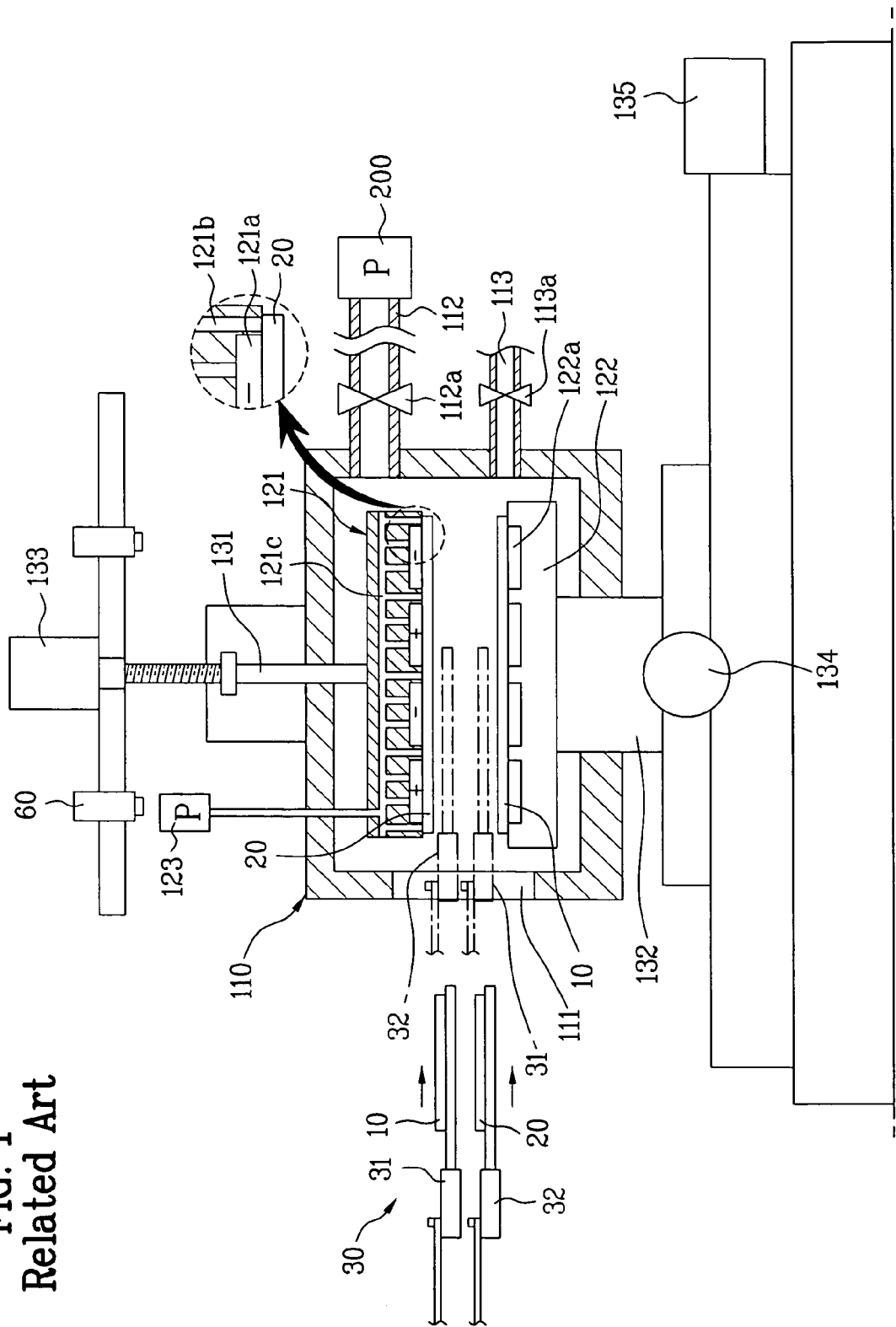
FIG. 1 is a diagram schematically illustrating a bonding apparatus for fabricating a liquid crystal display device filed by the applicant.
Figure 2A:
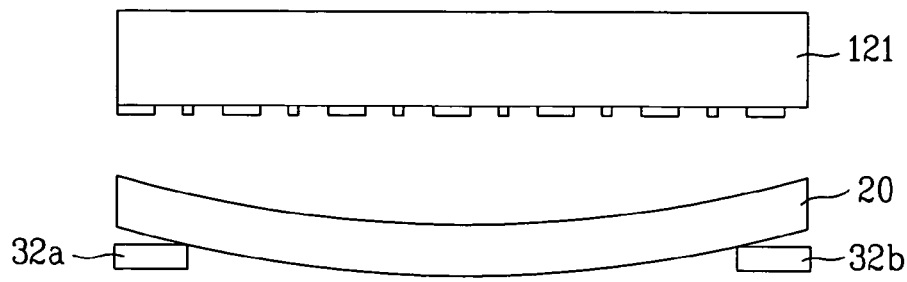
FIGS. 2A-2C schematically illustrate operation of the upper stage and the arms in FIG. 1.
Figure 2B:
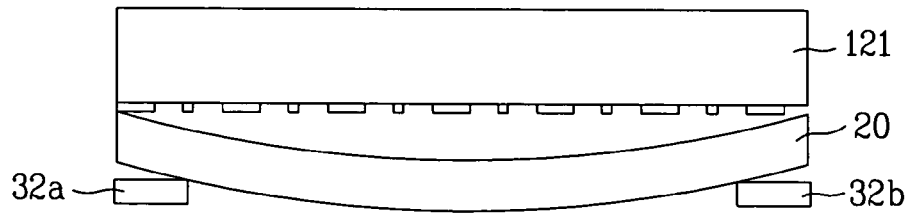
Figure 2C:
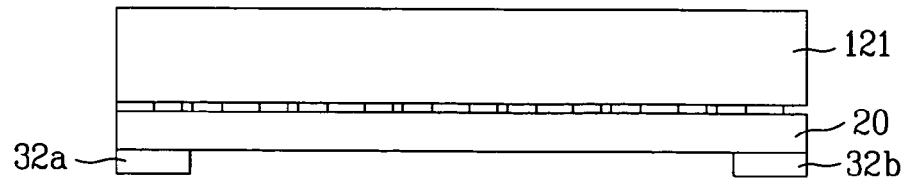

Accordingly, the loader and bonding apparatus for fabricating a liquid crystal display device of the present invention include a pad adsorption device provided to the upper stage of the bonding apparatus described in FIGS. 1 and 4 additionally, and a loader for holding a back side (a side having no material layer for forming the liquid crystal display device formed thereon) of the substrate with adsorption force, and inverting the substrate before loading the substrate, which will be described in detail.

Figure 5:
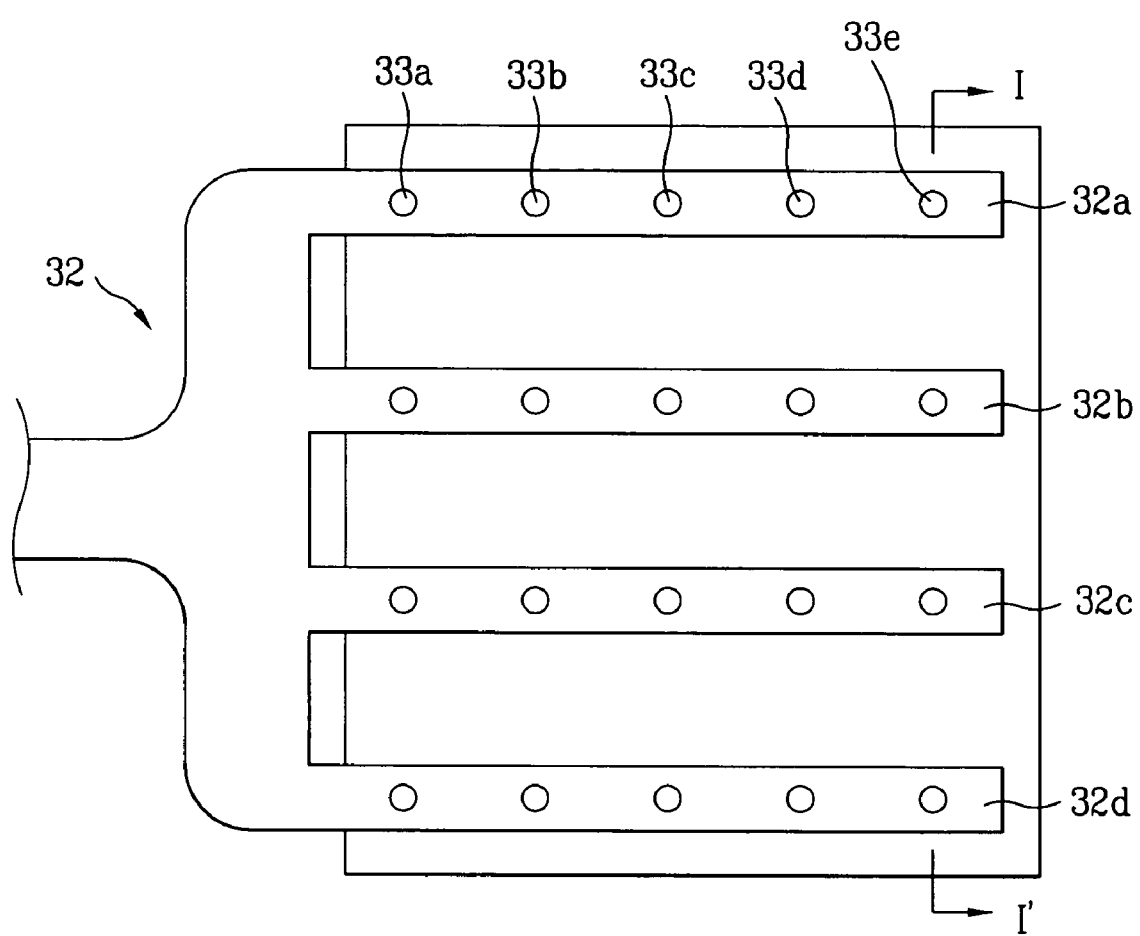
FIG. 5 is a plan view illustrating an arm of a loader in accordance with another embodiment of the present invention.
Figure 6:
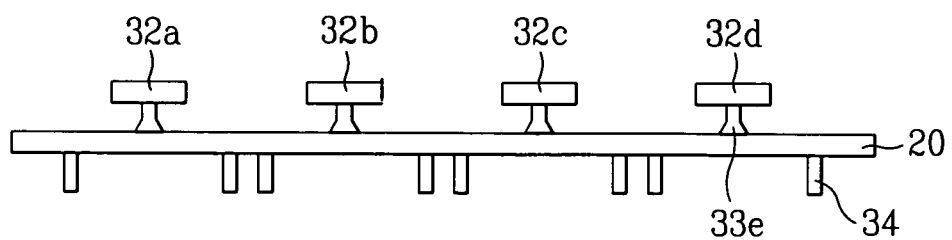
FIG. 6 illustrates a section across a line I-I' in FIG. 5.

FIG. 5 illustrates a plan view showing a state in which the loader in accordance with an embodiment of the present invention adsorbs a substrate, and FIG. 6 illustrates a section across a line I-I' in FIG. 5.

That is, referring to FIGS. 5 and 6, the loader includes at least one arm 32 having a plurality of robot fingers 32*a*~32*d* parallel to one another, and a plurality of adsorption pads 33*a*~33*e* formed at regular intervals on each of the robot fingers 32*a*~32*d* for adsorption of the substrate. The arm 32 can not only move forward/backward, but also rotate at least 180°. Though not shown, the loader further includes vacuum means for providing vacuum adsorption force to the adsorption pads 33*a*~33*e*, and a pipeline provided between the vacuum means and the adsorption pads 33*a*~33*e*. The pipeline may be provided inside of the robot fingers 32*a*~32*d*, or outside of the robot fingers 32*a*~32*d* through a separate hose.

FIGS. 5 and 6 illustrate a state in which the arm 32 of the loader adsorbs the back side of the substrate 20 by means of the adsorption pads 33*a*~33*e*, and inverts the substrate such that a side having the sealant 34 coated thereon faces downward.

Figure 7:
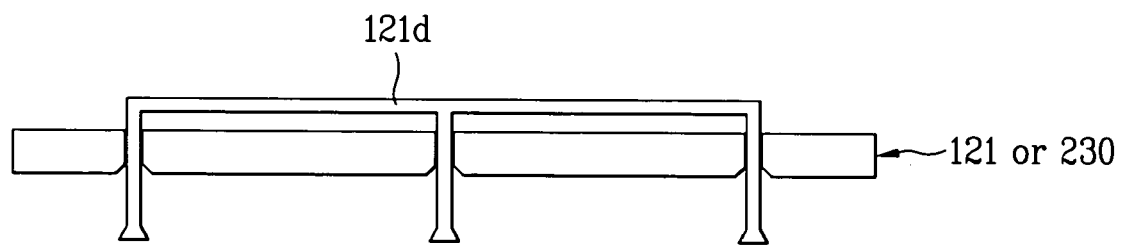
FIG. 7 illustrates a section of an upper stage of a bonding apparatus in accordance with a first embodiment of the present invention.

FIG. 7 illustrates a section of an upper stage of a bonding apparatus in accordance with a first embodiment of the present invention.

The upper stage 121 of the bonding apparatus in accordance with an embodiment of the present invention not only includes at least one electro static chuck (adsorption plate) mounted thereon for providing static force to hold the substrate and at least one vacuum hole for receiving vacuum force to adsorb and hold the substrate as described with reference to FIGS. 1 and 4, but also includes adsorption pins 121*d* for moving up/down to adsorb the substrate. The adsorption pins 121*d* are mounted at positions where the adsorption pins 121*d* do not overlap with the robot fingers 32*a*~32*d* which load the substrate, and portions of an upper surface of the upper stage where the adsorption pins 121*d* are formed have recesses respectively for receiving ends of the adsorption pins 121*d* into the upper stage 121 when the adsorption pins 121*d* rises fully.

A method for bonding substrates of a liquid crystal display device by using the loader and the bonding apparatus for fabricating a liquid crystal display device of the present invention will be described.

FIGS. 8A~8D illustrate the steps of operation of the upper stage and the loader in accordance with a first embodiment of the present invention.

A first substrate having a plurality of liquid crystal display panel regions defined thereon and a thin film transistor array formed on each of the liquid crystal display panel regions, and a second substrate having a color filter array form on each of the liquid crystal panel regions, are provided. Then, sealant 34 is coated on a periphery of each of the liquid crystal display panel regions on one of the first and second substrates for bonding the two substrates.

If it is intended to fabricate the liquid crystal display device by the liquid crystal dispensing method, an appropriate amount of the liquid crystal are dispensed onto each of the liquid crystal panel regions on one of the first or second substrate. The present invention is applicable both to the liquid crystal injection method and the liquid crystal dispensing method. For convenience of description, it is assumed that the liquid crystal are dispensed onto the first substrate, and the sealant is coated on the second substrate in the following description.

Then, the loader adsorbs a back side of one of the first substrate and the second substrate, where the back side is a side having no thin film transistors and no color filter array formed thereon. That is, back side of the substrate is adsorbed by using the adsorption pads 33*a*~33*e* on each of the robot fingers 32*a*~32*d*.

The substrates adsorbed thus are loaded on the bonding apparatus.

Figure 8A:
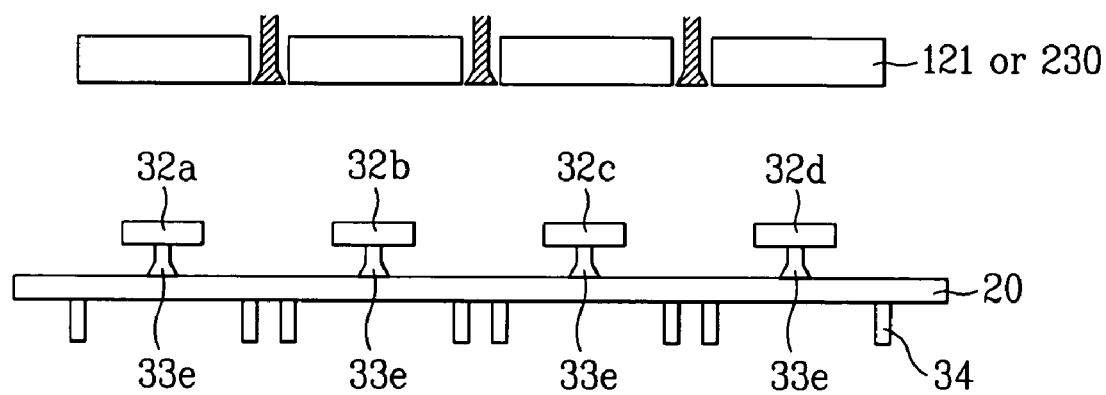
FIGS. 8A-8D illustrate the steps of operation of the upper stage and the loader in accordance with a first embodiment of the present invention.

That is, referring to FIG. 8A, after the arm 32 having the second substrate 20 adsorbed thereto is rotated 180° to invert the second substrate 20 such that a side of the second substrate 20 having the sealant coated thereon faces downward, the second substrate 20 is positioned under the upper stage 121 in the bonding apparatus. Of course, alike the related art, if the substrate is inverted by using the inverting device before loading the substrate on the bonding apparatus, the arm may be placed on the inverted substrate, and the substrate may be adsorbed and held by means of the adsorption pads.

Figure 8B:
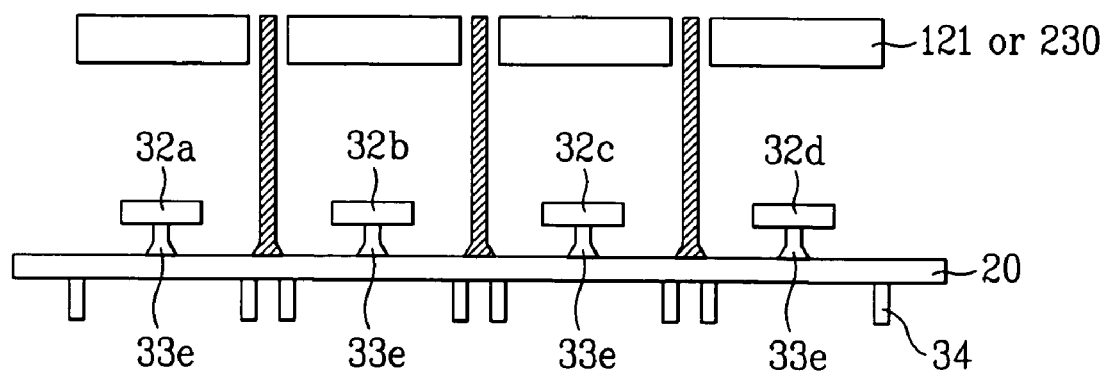

Referring to FIG. 8B, the adsorption pins 121*d* on the upper stage 121 move down and the back side of the second substrate 20 is adsorbed by the adsorption pins 121*d*. In this instance, if a distance between the second substrate 20 loaded on the bonding apparatus by the arm and the upper stage is far, the upper stage 121 may also move down for a distance.

Figure 8C:
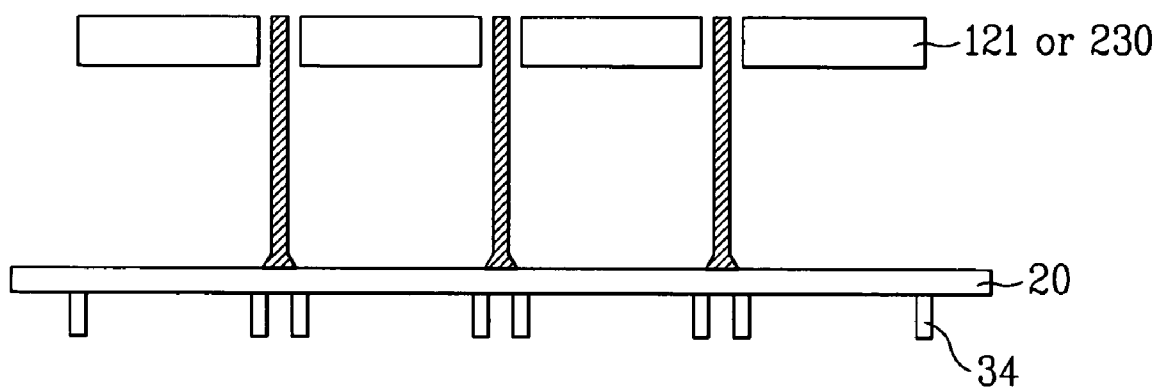

Referring to FIG. 8C, after the second substrate 20 is adsorbed by the adsorption pins 121*d*, the arm 32 of the loader releases the adsorption force of the adsorption pads 33*a*~33*e*, moves up slightly, to separate the second substrate 20 therefrom, moves out of the bonding apparatus.

Figure 8D:
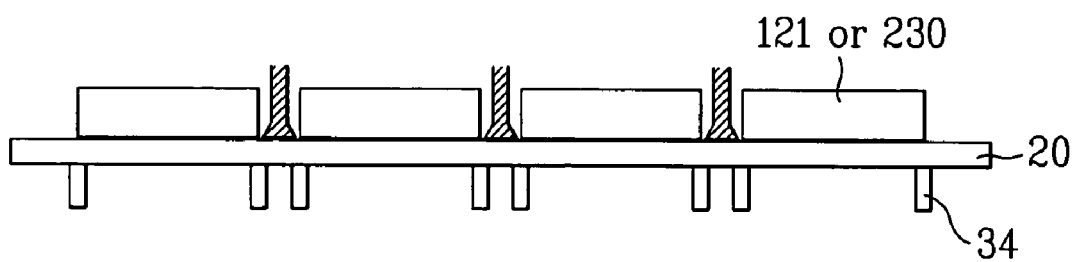

Referring to FIG. 8D, the adsorption pins 121*d* move up until the vacuum holes or the electro static chucks in the surface of the upper stage 121 (see 121*c* and 121*a* in FIG. 1) adsorb the second substrate 20. In this instance, the adsorption pins 121*d* are fully received in the upper stage 121. Thus, the loading of the second substrate 20 on the upper stage is finished.

Though not shown, as described with reference to FIGS. 1 and 4, the arm adsorbs the first substrate and then loads the first substrate on the lower stage 122 or 240 without inverting the first substrate. Therefore, the arm that loads the first substrate may be identical to the related art because fingers of the arm are brought into contact with the back side of substrate without inverting the substrate.

In this instance, the adsorption pins 121d on the upper stage 121 may be used as separating means for separating the bonded substrates from the upper stage after the first and the second substrates are bonded primarily.

Figure 3A:
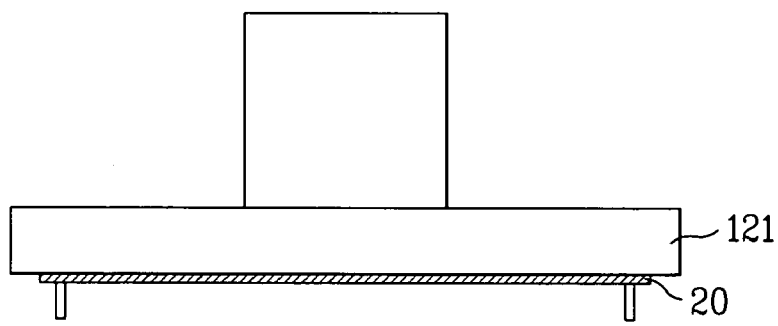
FIGS. 3A-3C illustrate the steps of the bonding method in FIG. 1.
Figure 3A:
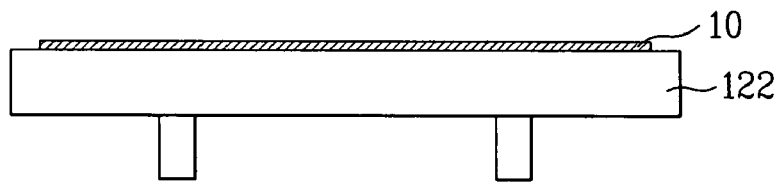
Figure 3B:
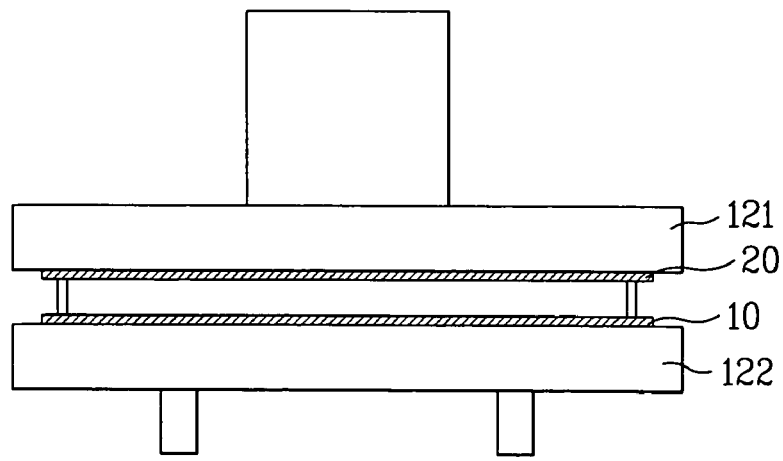
Figure 3C:
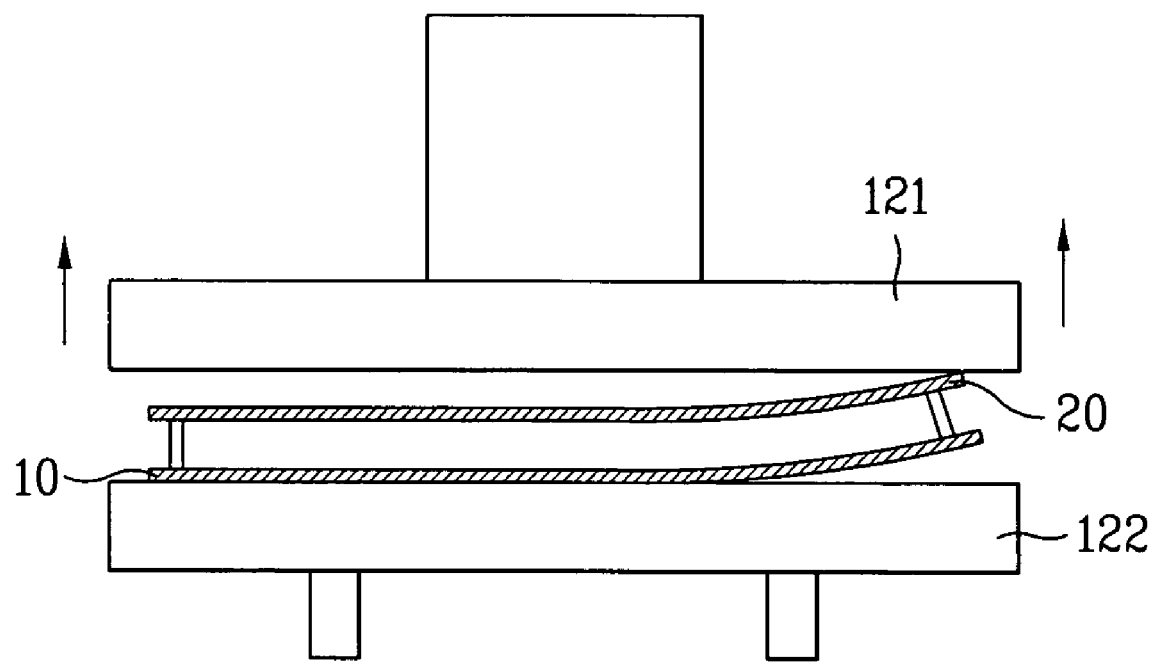

That is, referring to FIG. 3C, upon finishing the primary bonding of the first, and second substrates, the static adsorption force of the upper stage 121 is removed, and the upper stage 121 is separated from the bonded substrates 10 and 20. In this instance, it is possible that the bonded substrates 10 and 20 are lifted following the upper stage 121 that is moving upward. In order to prevent this, at the time the upper stage 121 is separated from the bonded substrates 10 and 20, the adsorption pins 121d may be moved down so that the bonded first and second substrates 10 and 20 are separated from the upper stage 121 easily.

Figure 9:
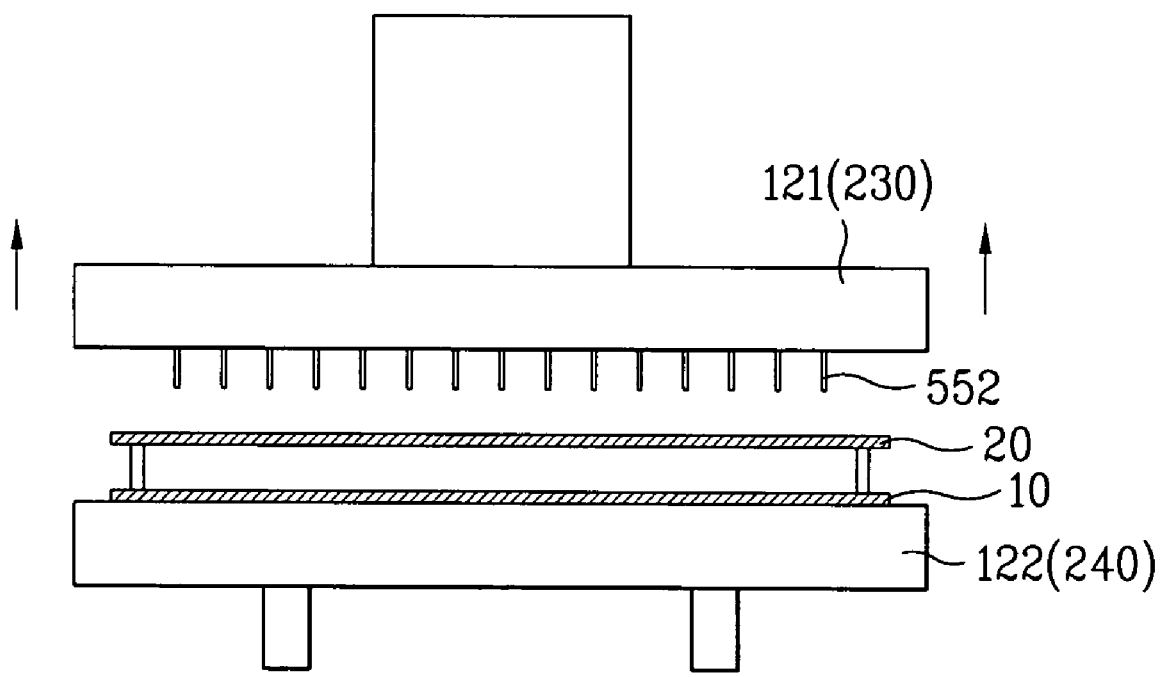
FIG. 9 illustrates separating means to an upper stage in a bonding apparatus in accordance with a second embodiment of the present invention.

Or alternatively, separating means may be provided to the upper stage additionally, which will be described in detail. FIG. 9 illustrates a section showing separating means to an upper stage in a bonding apparatus in accordance with a second embodiment of the present invention.

Referring to FIG. 9, during the upper stage 121 or 230 is moved upward from the bonded substrate 10 and 20 before or after pressing down the sealant and venting the chamber, separating pins 552 are moved for preventing the bonded substrates from being lifted following the upper stage that is moving upward.

Figure 10:
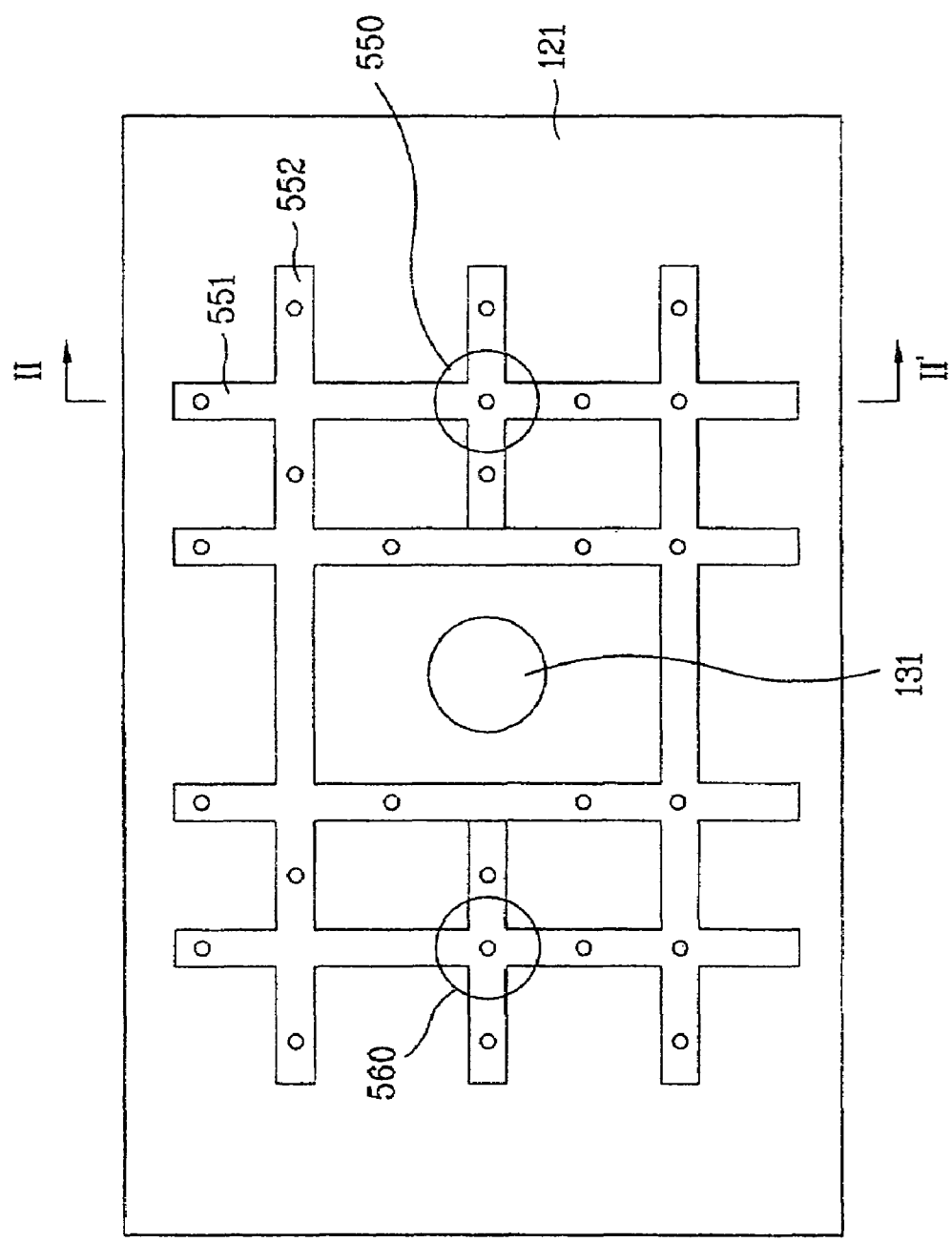
FIG. 10 is a plan view illustrating an upper stage having a separating means formed thereon in accordance with a second embodiment of the present invention.
Figure 11:
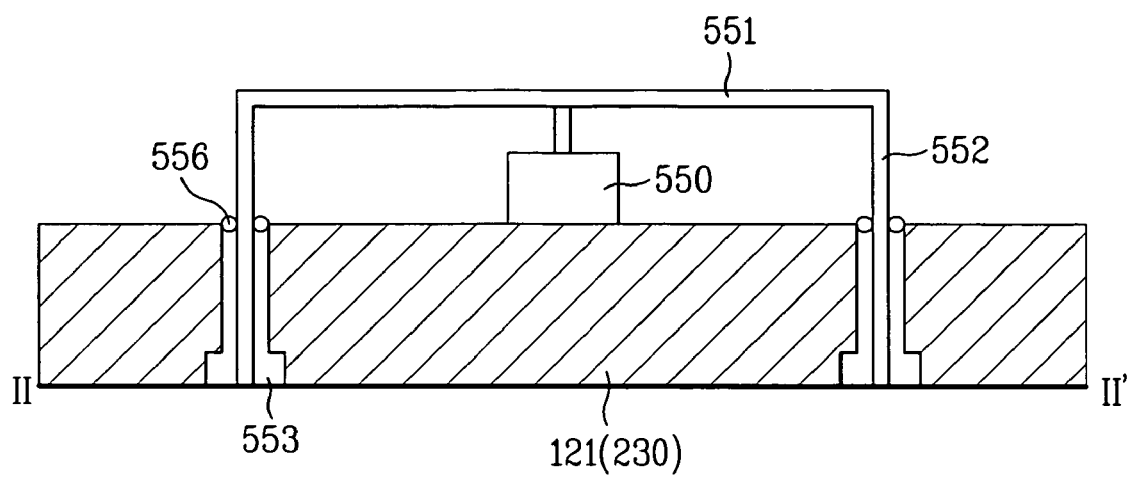
FIG. 11 illustrates a section of the upper stage across a line II-II' in FIG. 10.

FIG. 10 illustrates a plan view of an upper stage having a separating means formed thereon in accordance with a second embodiment of the present invention, and FIG. 11 illustrates a section of the upper stage across a line II-II' in FIG. 10.

Referring to FIG. 1, the moving shaft 131 for moving the upper stage 121 up/down is mounted at a central portion of the upper stage 121. Therefore, for moving up/down the separating means, first and second posts 550 and 560, which can have a cross section of any suitable geometrical shape, for moving the separating means up/down are fixed to an upper portion of the upper stage on opposite sides of the moving shaft. A power transmission member 551 is provided to shafts of the posts 550 and 560 and is parallel to the upper stage 121. The power transmission member 551 has a plurality of vertical pins 552 for moving up/down through pass through holes 553. Pass through holes 553 are formed in the upper stage 121 for passing of the pins at regular intervals.

This configuration is applicable to the bonding apparatus in FIG. 4, too. That is, because the bonding apparatus in FIG. 4 has no moving shaft and no separate vacuum chamber, a configuration in FIGS. 10 and 11 is required to be changed such that one post 550 is mounted at a central portion of the upper stage 230, and leakage of air between the pass through holes 553 and the pins 552 is blocked. Therefore, it is required to provide an O-ring 556 between the pass through hole 553 and the pin 552.

Figure 12:
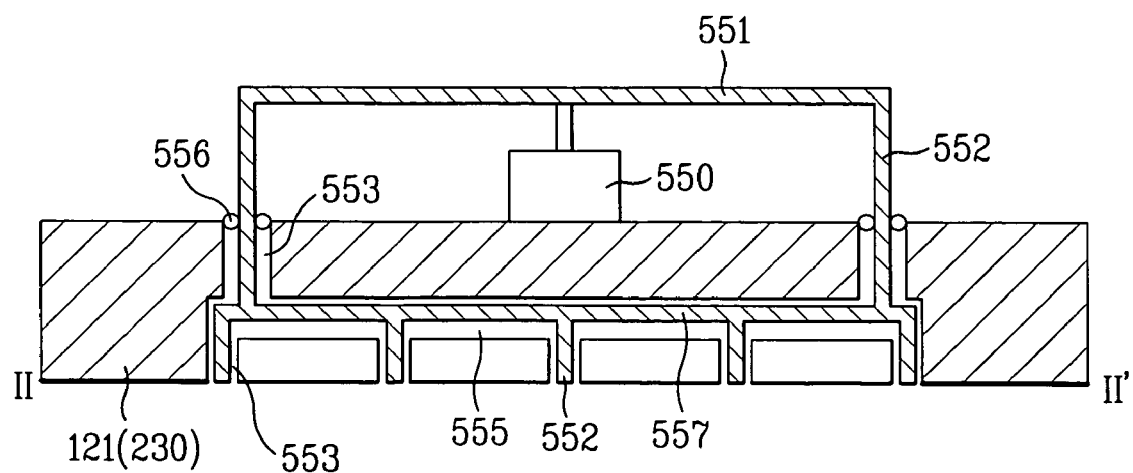
FIG. 12 illustrates a section of the upper stage across a line II-II' in FIG. 10 in accordance with another embodiment of the present invention.

FIG. 12 illustrates a section of the upper stage across a line II-II' in FIG. 10 in accordance with another embodiment of the present invention.

Referring to FIG. 12, the separating means in accordance with another embodiment of the present invention includes not only the pass through holes 553, but also a moving space 555 inside of the upper stage 121 or 230, for moving the separating means up/down. Accordingly, first and second posts 550 and 560 are fixed on opposite sides of the moving shaft for moving up/down the separating means, a power transmission member 551 is provided to shafts of the posts 550 and 560 parallel to the upper stage 121, and a connecting member 557 is provided in the moving space 555, which is connected to the power transmission member 551, and a plurality of vertical pins 552 are formed on the connecting member 557, for moving up/down the pass through holes 553.

The separating means in accordance with another embodiment of the present invention is also applicable to the bonding apparatus in FIG. 4.

That is, because the bonding apparatus in FIG. 4 has no moving shaft, and no separate vacuum chamber, a configuration in FIGS. 10 and 11 is required to be changed such that one post 550 is mounted at a central portion of the upper stage 230, and leakage of air between the pass through holes 553 and the power transmission member 551 are blocked. Therefore, it is required to provide an O-ring 556 between the pass through hole 553 and the power transmission member 551.

A shape of the separating means is not limited to the pin shape, but may have a bar shape.

FIGS. 13 to 16 illustrate back side views of upper stages in accordance with other embodiments of the present invention.

Figure 13:
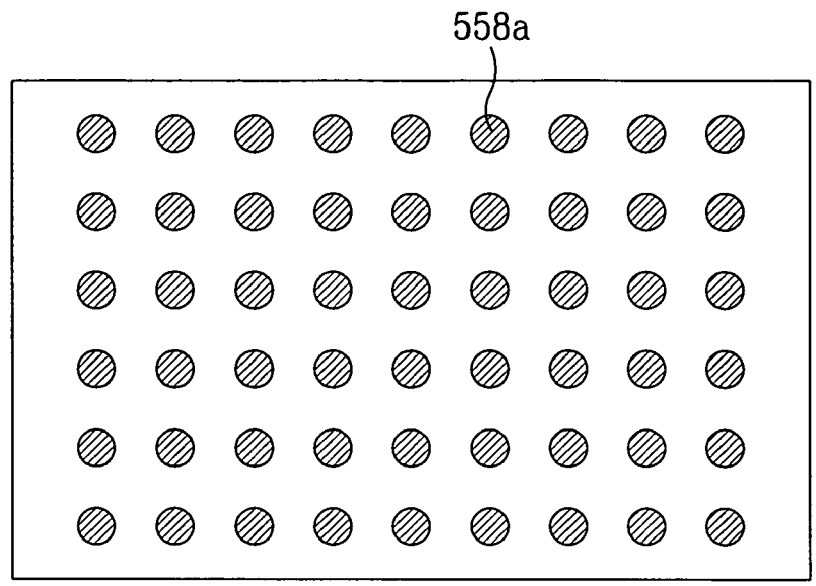
FIGS. 13 to 16 illustrate back side views of upper stages in accordance with other embodiments of the present invention.
Figure 14:
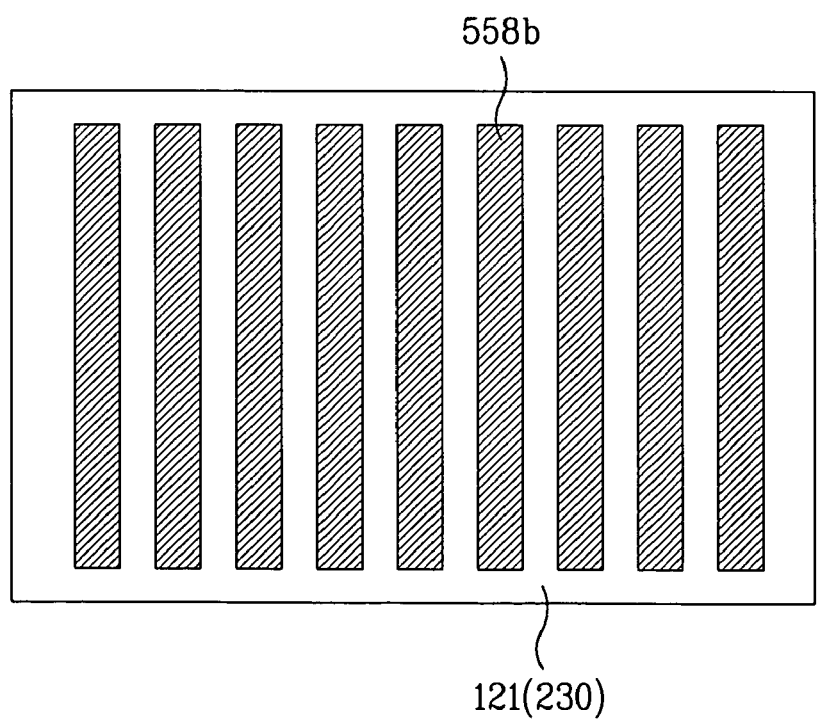
Figure 15:
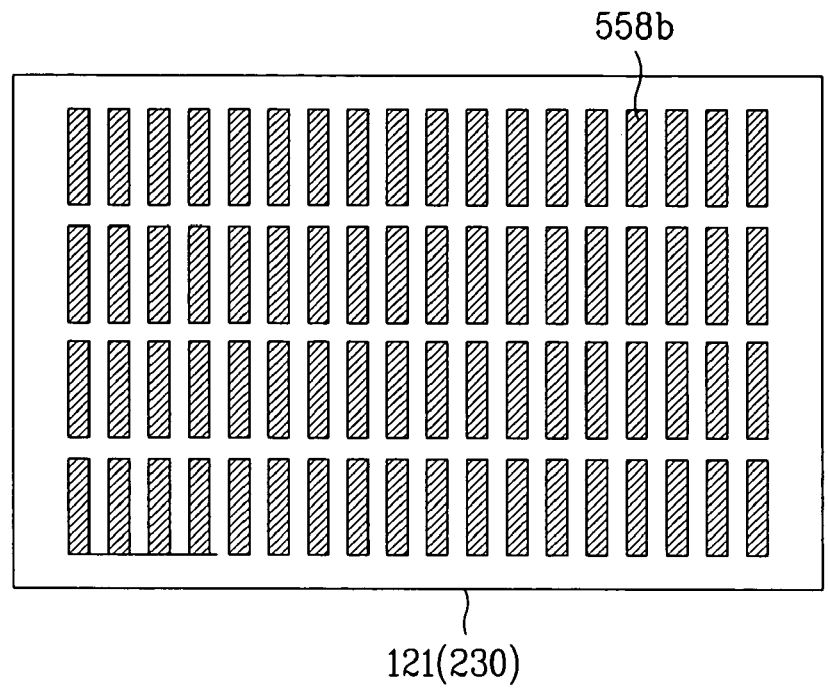
Figure 16:
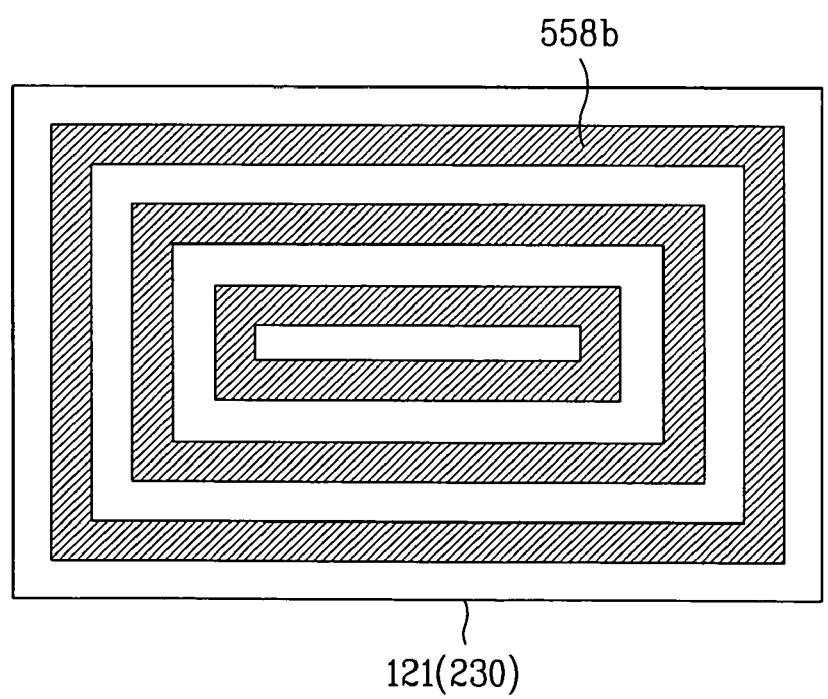

That is, referring to FIG. 13, the separating means may have not only the pin shape, but also bar shapes as illustrated in FIGS. 14~16.

Pin shapes or bar shapes of recesses are formed in the back side of the upper stage 121 or 230, and pins 558a or bars 558b are received in the recesses respectively. As described with reference to FIGS. 10 to 12, a post 550 is fixed to an upper surface of the upper stage 121 or 230, pass through holes 553 or moving space 555 is formed in the upper stage 121 or 230, for movement of a power transmission member 551 and/or a connecting member 557, and the pins 558a or the bars 558b are connected to the power transmission member 551 or the connecting member 557.

FIG. 14 illustrates an embodiment in which the bars 558b are formed in one direction, FIG. 15 illustrates an embodiment in which the bars 558b are arranged in a matrix, and FIG. 16 illustrates an embodiment in which the bars 558b are in a plurality of ring or closed form.

As has been described, the loader and bonding apparatus for fabricating a liquid crystal display device and loading method thereof have the following advantages.

First, the adsorption of a back side of a substrate by a loader in loading the substrate on a bonding apparatus that enables provision of many robot fingers on the arm of the loader, permits stable loading of the substrate.

Second, the adsorption and holding of the back side of the substrate by using adsorption pads on the robot fingers in loading of the substrate on the bonding apparatus prevents the substrate from sagging, and easy adsorption of the substrate to the upper stage.

Third, the inversion of the substrate in a state a plurality of adsorption pads on each of the robot fingers of the arm adsorb and hold the back side of the substrate permits to dispense with a separate inverting device for inverting the substrate, which reduces an installation cost of a production line.

Fourth, separating means is provided to the upper stage for separating the bonded substrates from the upper stage in moving up of the upper stage before or after venting the vacuum chamber after bonding of two substrates. According to this, lifting of the substrates following the upper stage which is moving upward can be prevented, thereby preventing separation of the bonded two substrates, or damage to the sealant that holds the two substrate together, causing infiltration of air between the two bonded substrates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A loader for fabricating a liquid crystal display device comprising:
   at least one arm having a plurality of robot fingers, and a plurality of adsorption pads on each of the robot fingers for adsorbing a substrate;
   vacuum means for providing vacuum adsorption force to each of the adsorption pads; and
   a pipeline provided between the vacuum means and the adsorption pads.

2. The loader as claimed in claim 1, wherein the arm is rotatable.

3. The loader as claimed in claim 2, wherein the arm is rotatable at least about 180°.

4. The loader as claimed in claim 2, wherein the arm is rotatable at least about 90°.

5. A stage for use in a bonding apparatus for fabricating a liquid crystal display device, comprising:
   a plate having a plurality of adsorption pins, and the adsorption pins being movable in vertical direction with respect to the plate for adsorption of a substrate by the adsorption pins.

6. The stage as claimed in claim 5, wherein the adsorption pins are capable of separating substrates from the plate after a bonding process.

7. The stage as claimed in claim 5, wherein the adsorption pins pass through pass through holes in the plate.

8. The stage as claimed in claim 7, further comprising a sealing means between respective ones of the adsorption pins and the pass through holes.

9. The stage as claimed in claim 8, wherein the sealing means includes O-ring.

10. The stage as claimed in claim 5, further comprising a vacuum supply means for providing a vacuum to the adsorption pins.

11. The stage as claimed in claim 5, further comprising a separating means at the plate, wherein the separating means is movable in a vertical direction with respect to the plate.

12. The stage as claimed in claim 11, wherein the separating means includes a plurality of pins.

13. The stage as claimed in claim 12, wherein the pins are in a matrix.

14. The stage as claimed in claim 11, wherein the separating means includes a plurality of bars.

15. The stage as claimed in claim 14, wherein the bars are in a matrix.

16. The stage as claimed in claim 11, wherein the separating means has a ring shape.

17. The stage as claimed in claim 11, wherein the separating means includes:
   at least one post and a power transmission member;
   a plurality of pass through holes to pass through the plate; and
   a plurality of pins connected to the power transmission member for moving vertically with respect to the plate through the pass through holes.

18. The stage as claimed in claim 11, wherein the separating means includes:
   at least one post and a power transmission member;
   a plurality of pass through holes to pass through the plate;
   a plurality of bar shaped recesses in an underside surface of the plate; and
   a plurality of bars receivable in the recesses, the bars being connected to the power transmission member for moving vertically with respect to the plate through the pass through holes.

19. The stage as claimed in claim 18, wherein the bars are arranged in one direction.

20. The stage as claimed in claim 18, wherein the bars are arranged in a form of matrix.

21. The stage as claimed in claim 18, wherein the bars are arranged in forms of rings.

22. The stage as claimed in claim 11, wherein the separating means includes:
   at least one post and a power transmission member;
   pass through holes in the plate;
   a connecting member connected to the power transmission member; and
   a plurality of pins connected to the connecting member for moving vertically with respect to the plate through the pass through holes.

23. An apparatus for bonding substrates together, comprising:
   a loader including at least one arm having a plurality of robot fingers and a plurality of adsorption pads on each of the robot fingers for adsorbing a substrate; and
   a bonding chamber including a stage having a plate with a plurality of adsorption pins, and the adsorption pins being movable in a vertical direction with respect to the plate for adsorption of a substrate by the adsorption pins.

24. The apparatus as claimed in claim 23, wherein the adsorption pins are capable of separating substrates from the plate after a bonding process.

25. The apparatus as claimed in claim 23, wherein the adsorption pins pass through pass through holes in the plate.

26. The apparatus as claimed in claim 25, further comprising a sealing means between respective ones of the adsorption pins and the pass through holes.

27. The apparatus as claimed in claim 26, wherein the sealing means includes O-ring.

28. The apparatus as claimed in claim 23, further comprising a vacuum supply means for providing a vacuum to the adsorption pins.

29. The apparatus as claimed in claim 23, further comprising a separating means at the plate, wherein the separating means is movable in a vertical direction with respect to the plate.

30. The apparatus as claimed in claim 29, wherein the separating means includes a plurality of pins.

31. The apparatus as claimed in claim 30, wherein the pins are in a matrix.

32. The apparatus as claimed in claim 29, wherein the separating means includes a plurality of bars.

33. The apparatus as claimed in claim 32, wherein the bars are in a matrix.

34. The apparatus as claimed in claim 29, wherein the separating means has a ring shape.

35. The apparatus as claimed in claim 29, wherein the separating means includes:
   at least one post and a power transmission member;
   a plurality of pass through holes to pass through the plate; and a plurality of pins connected to the power transmission member for moving vertically with respect to the plate through the pass through holes.

36. The apparatus as claimed in claim 29, wherein the separating means includes:
    at least one post and a power transmission member;
    a plurality of pass through holes to pass through the plate;
    a plurality of bar shaped recesses in an underside surface of the plate; and
    a plurality of bars receivable in the recesses, the bars being connected to the power transmission member for moving vertically with respect to the plate through the pass through holes.

37. The apparatus as claimed in claim 36, wherein the bars are arranged in one direction.

38. The apparatus as claimed in claim 36, wherein the bars are arranged in a form of matrix.

39. The apparatus as claimed in claim 36, wherein the bars are arranged in forms of rings.

40. The apparatus as claimed in claim 29, wherein the separating means includes:
    at least one post and a power transmission member;
    pass through holes in the plate;
    a connecting member connected to the power transmission member; and
    a plurality of pins connected to the connecting member for moving vertically with respect to the plate through the pass through holes.

* * * * *